Patented June 12, 1934

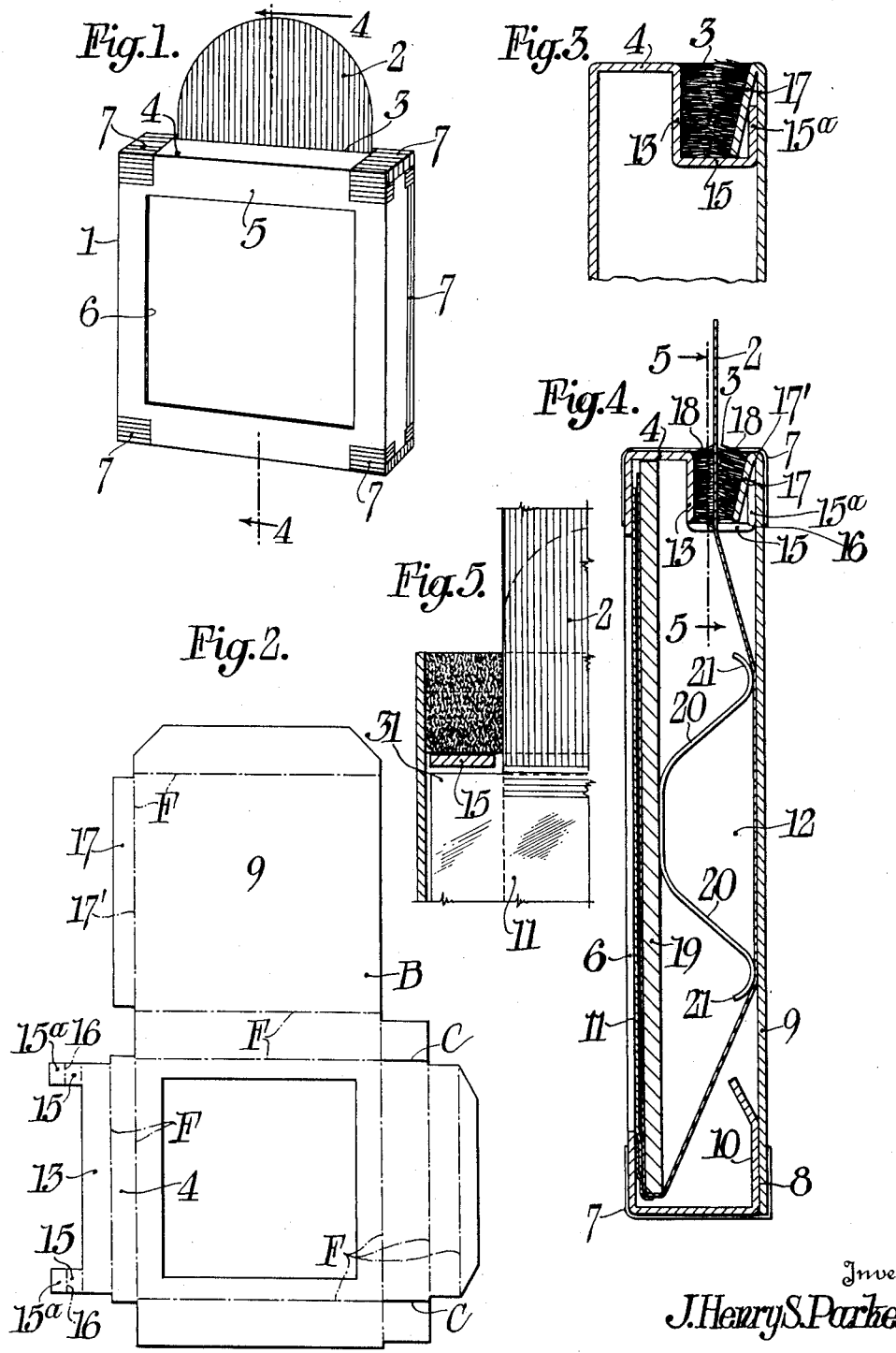

1,962,359

UNITED STATES PATENT OFFICE 1,962,359

FILM PACK

J. Henry S. Parker, Rochester, N. Y., assignor to Eastman Kodak Company, Rochester, N. Y., a corporation of New York Application March 15, 1933, Serial No. 660,896

5 Claims. (Cl. 95—22)

This invention relates to photography and more particularly to packages of photographic film prepared for exposure and generally called film packs. One object of my invention is to provide an extremely inexpensive film pack. Another object of my invention is to provide a film pack including a casing of a single piece of properly folded material. Another object of my invention is to provide a light tight exit for the film pack tabs. Still another object of my invention is to provide a light tight exit for film pack tabs in which the sides of the light locking members are held together at the ends by strips which also provide stops to prevent the films from being drawn out through the tab openings. Other objects will appear from the following specification, the novel features being pointed out in the claims at the end thereof.

Coming now to the drawing wherein like reference characters denote like parts throughout.

Fig. 1 is a perspective view of a film pack constructed in accordance with and embodying a preferred form of my invention.

Fig. 2 is a plan view of a blank from which the film pack casing shown in Fig. 1 may be folded up.

Fig. 3 is an enlarged fragmentary sectional view showing the end of the slot through which the film pack tabs may be drawn.

Fig. 4 is an enlarged sectional view through the film pack shown in Fig. 1. This section may be taken on line 4—4 of Fig. 1.

Fig. 5 is an enlarged detail sectional view showing a portion of the film pack casing and may be taken on line 5—5 of Fig. 4.

As will appear from Fig. 1 the film pack consists broadly of a casing member 1 in which a series of films may be mounted, each film being attached to a film pack tab 2 which projects through a slot or opening 3 in the upper wall of the film pack. In the front wall 5 of the film pack there is an exposure opening 6, that is, an opening through which exposures are made on the film.

Referring to Fig. 2 in order to make the box-like housing which encloses the film a blank B may be used formed as shown in this figure. This blank consists of a single piece of material which may be folded up along the folding lines indicated at F by the dot and dash line. The solid lines C indicates where cuts have been made into the material to produce tabs or flaps.

As best indicated in Figs. 1 and 4, the edges of the film pack may be reinforced with pasters 7 at those places where two edges come together. These pasters not only hold the separate flaps of the folded up blank together but being of light tight material they form a light tight joint therewith. Thus, as indicated in Fig. 4, the paster 7 overlies the joint 8 which is formed between the back 9 of the film pack casing and the flap 10, this flap lying inside of the wall 9 but being held against the wall by means of the paster 7.

One of the features of my film pack is the light tight opening 3 through which the film pack tabs 2 are drawn to move a sheet of film 11 from in front of the exposure window 6 back into the exposed film chamber 12.

The structure of this opening is shown in Figs. 3, 4 and 5. Referring particularly to Fig. 4 the top wall 4 of the film pack casing is provided with a downwardly extending flap 13, this flap being also provided with extending flaps 15 having a weakened line 16 in the center upon which these flaps may be bent. The rear wall 9 of the film pack casing is provided with a flap 17 which may be bent sharply along the line 17' so as to lie in a substantially parallel position with respect to the flap 13.

The flaps 13 and 17 are both covered with a suitable light locking material such as plush 18 so that the nap on the plush from flap 17 extends into or faces the nap on the flap 13. This forms a light tight connection on both sides of a film pack tab 2 which is drawn up through the opening 3.

Since the flaps 13 and 15 are formed of cardboard strips it is preferable to have something to hold them in a fixed relation with respect to each other. To accomplish this the flaps 15 are positioned as shown in Fig. 4 with one portion lying between the flaps 13 and 17 and with another portion 15$^a$ extending up behind the flap 17.

These flaps form stops which limit the movement of the film relative to the opening 3 and in addition they form straps to hold the flaps 13 and 17 together.

As indicated in Fig. 5, the strip 15 extends across between the flaps 13 and 17 only at the extreme edges of the pack. Thus, there is a space between the edges as wide as the film pack tab 2 through which these tabs can freely pass and the corners 31 of the films 11 are limited in their movement towards slot 3 by the strips 15.

As is customary with film packs, on the inside of the film pack casing 1 there is provided a flat pressure board 19. This may be constructed of heavy cardboard and is normally thrust toward the exposure aperture 6 by means of a spring 20. This spring should have rounded ends 21 which may bear against the film backing paper 2 with a light resilient pressure so as not to damage the films as they are drawn into the exposed film chamber 12. While I have only shown a single film in the film pack casing as illustrated in Fig. 4 this has been done because it is easy to illustrate the path and position of a single film whereas, if a number of films were shown, it would be difficult to follow the construction of the pack.

It is to be understood that this film pack is adapted to contain a number of films such as four or six in an extremely inexpensive pack although it is obvious that if desired the usual twelve films could be placed in a pack of this type.

It should be noted that the film pack which has just been described is extremely simple in construction, the entire casing being made of a single piece of suitable material such as light cardboard folded up into the shape of a hollow box-like structure for containing the film. The pressure member is made from a separate sheet of heavier material but it, too, is of extremely simple and inexpensive construction. With a film pack made from a blank in accordance with the illustration in Fig. 2 it is only necessary to fold up the blank properly and to fasten the pasters 7 over the edges to form a light tight box-like retainer for the film.

I claim:—

1. In a film pack, the combination with a box-like housing containing film with tabs, including a slot in said housing through which said tabs may be withdrawn, of means for rendering said slot light tight comprising a pair of substantially parallel flaps having light locking material therebetween, and means for preventing the flaps from separating located near the ends of the flaps.

2. In a film pack, the combination with a box-like housing containing film with tabs, including a slot in said housing through which said tabs may be withdrawn, of means for rendering said slot light tight comprising a pair of substantially parallel flaps having light locking material therebetween, and means for preventing the flaps from separating comprising tabs extending from one flap to a position behind the other flap.

3. In a film pack, the combination with a box-like housing containing film with tabs, including a slot in said housing through which said tabs may be withdrawn, of means for rendering said slot light tight comprising a pair of substantially parallel flaps having light locking material therebetween, and means for preventing the flaps from separating comprising tabs extending from one flap to a position behind the other flap located near the ends of the film.

4. In a film pack, the combination with a box-like housing containing film with tabs, including a slot in said housing through which said tabs may be withdrawn, of means for rendering said slot light tight comprising a pair of substantially parallel flaps, a facing of plush on each flap and means for holding the plush facings in contact comprising members carried by one flap engaging with the other flap at spaced portions thereof.

5. In a film pack, the combination with a box-like housing having a front wall including an exposure opening, a rear wall, a slotted top wall, bottom and side walls, of means for rendering the slotted top wall light proof, comprising one flap bent from the back wall, another flap bent from the top wall, light proofing material carried between said flaps, and flaps carried by the top wall flap and extending up between the rear wall flap and the rear wall whereby the two flaps are prevented from separating.

J. HENRY S. PARKER.